July 11, 1933.  C. J. SCRANTON, JR  1,917,604
SICKLE GUARD AND SHIELD
Filed April 30, 1931
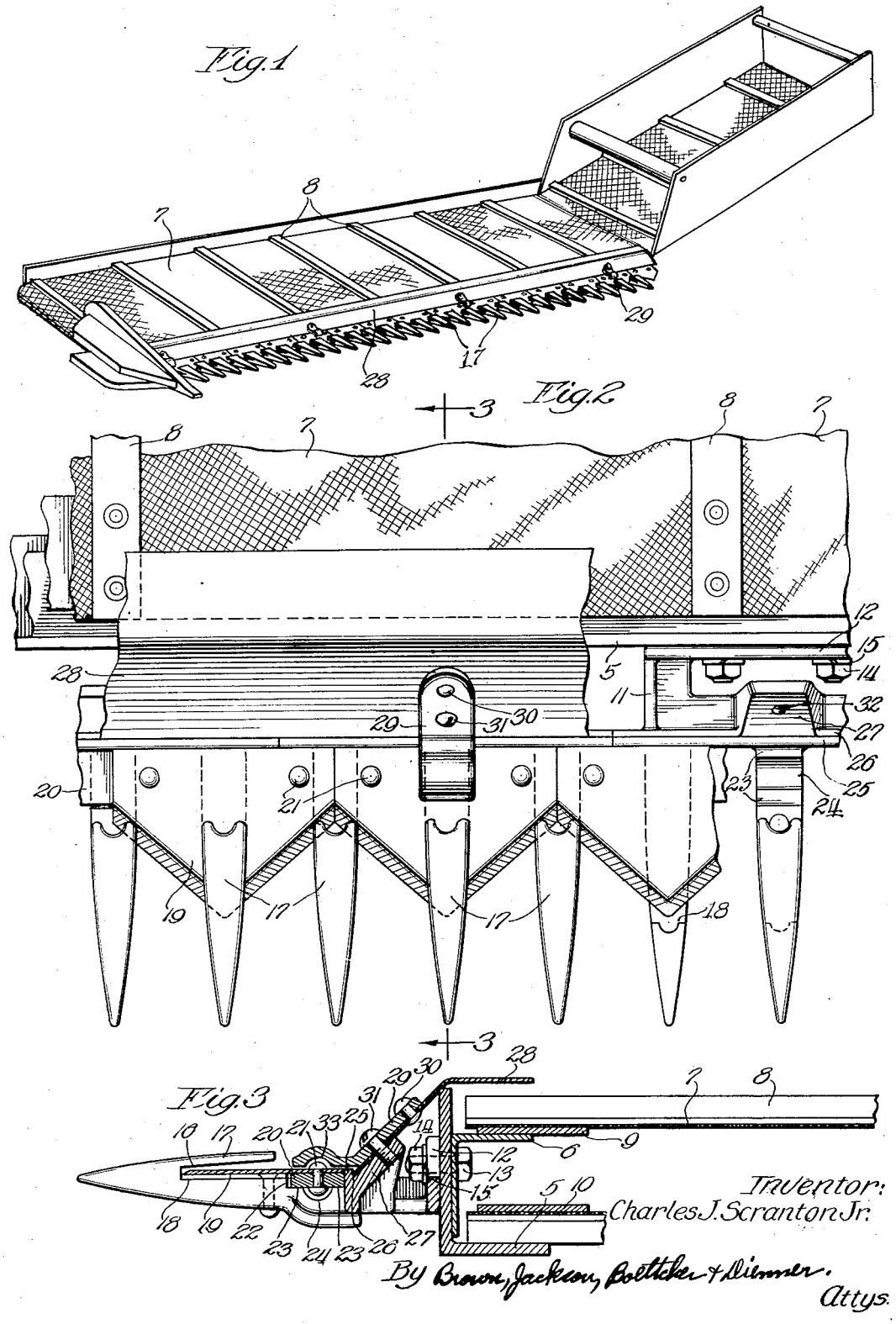

Patented July 11, 1933

1,917,604

UNITED STATES PATENT OFFICE

CHARLES J. SCRANTON, JR., OF PEORIA, ILLINOIS, ASSIGNOR TO AVERY POWER MACHINERY CO., OF PEORIA, ILLINOIS, A CORPORATION OF ILLINOIS

SICKLE GUARD AND SHIELD

Application filed April 30, 1931. Serial No. 533,876.

This invention relates to a guard or shield, and more particularly to a guard or shield for use on low down sickles of harvesters and the like.

The sickle of a modern harvesting machine is supported on a framework of the harvesting unit, on which it is reciprocated by suitable mechanism. This framework also carries a plurality of fingers or sickle guards, suitably secured to the framework and projecting forwardly therefrom, to guide the standing crop into proper relation with the sickle to be cut thereby. A conveyor is also mounted in the framework in rear of the sickle and parallel therewith, for delivering the crop, as it is cut, to the feed house of the harvester.

In the harvesting of certain types of crops, particularly vine crops such as soy beans, for which my invention is particularly adapted, it is necessary to cut the crop close to the ground. The reason for this is that the bean pods branch off of the stem of the vines close to the ground, so that it is frequently necessary to cut as low as to within one or two inches of the ground. Various cutting mechanisms have been designed to meet this condition, but I find that in such mechanisms the manner of mounting the sickle guards upon the framework has resulted in the formation of a vertical wall, by the framework, between the upper face of the sickle bar and the conveyor, over which the crop cannot be delivered properly with the result that a smooth and continuous delivery of the cut vines cannot be had.

It is, therefore, one of the objects of the present invention to provide a suitable shield, disposed between the upper portion of the sickle bar and the conveyor, for assuring a smooth and continuous delivery of the vines over the front sill of the conveyor frame to the conveyor.

I am aware that various attempts have been made to provide a suitable shield for conducting the cut crop over the front sill of the conveyor frame, but in all such devices with which I am familiar, the shield has been spaced from the sickle bar with the result that the vines get in between the sickle bar and the shield, causing clogging and often necessitating serious delay in freeing the sickle bar.

Another object of the present invention is to provide means for securing the shield in such manner as to prevent passage of any of the cut vines beneath the shield.

Other objects and advantages of my invention will appear from the following detailed description, taken in connection with the accompanying drawing, which illustrates a preferred embodiment thereof, and in which:

Figure 1 is an isometric view of the sickle guard and the associated conveyor showing the shield in place thereon;

Figure 2 is an enlarged fragmentary plan view of the sickle and sickle guard with the shield attached thereto, said shield being partly broken away; and Figure 3 is a section taken substantially along the line 3—3 of Figure 2, parts being shown in elevation.

I have illustrated my invention as applied to a known type of harvesting unit, which, in practice, is associated with a combine and suitably supported for transportation, in a known manner. This unit consists of a suitable frame, the forward portion of which comprises a sill 5 and an angle bar 6 disposed in abutting relation, as shown in Figure 3, and supporting the front of a conveyor 7. This conveyor has slats 8 extending transversely thereof and, at its inner end, that is, the end adjacent the harvester, is inclined upwardly to provide an elevator for delivering the cut vines to the feed house (not shown) of the harvester. Supporting strips 9 and 10 serve to support and guide the upper and lower runs, respectively, of the conveyor.

As will be seen from Figure 3, the guard fingers taper forwardly. These fingers are usually formed of malleable iron. In the embodiment shown, the fingers have been cast in units of three, although they may be cast in a greater or less number without departing from the spirit of the present invention, and each unit is provided with a rearwardly extending rectangular frame 11. Inasmuch as each unit is substantially a duplicate of each of the other guard units disposed upon the framework of the harvesting unit, a description of one of such guard units will suffice. Suitable lugs 12 are cast integrally with the rear portion of the frame 11 to facilitate securing of the guard fingers to the framework of the harvesting unit. These lugs abut the forward face of the sill 5, and are secured thereto by means of bolts 13, nuts 14 and associated lock washers 15.

The guard fingers are tapered, in a known manner, to facilitate their nosing their way into the crop. Each guard finger has a slot 16 formed therein, defined by an upper guard 17 and a ledger plate 18, and sickle knives 19 extend forward into such slots, these knives resting upon said ledger plates and being secured to a cutter bar 20 in a suitable manner, as by means of rivets 21. The cutter bar 20 abuts shoulders 22 formed upon the faces of the fingers adjacent the rear edges of the ledger plates 18, and slidingly rests upon ledges 23 formed by depressions 24, these depressions permitting of free sliding movement of the rivets 21.

The rear portion of the cutter bar 20 abuts a shoulder 25 which is formed integrally with the frame 11. This shoulder extends laterally of said frame and beyond the sides thereof to abut similar shoulders formed on adjacent guard finger units. The rear portion of this shoulder is grooved or rabbeted, as shown at 26, for a purpose which will be hereinafter described. A lug 27, also formed integrally with the frame 11, is disposed substantially midway of the length thereof and adjacent the rear face of the shoulder 25. This lug extends upwardly above the frame 11 and has its forward face inclined rearwardly and upwardly from shoulder 25.

A shield 28 is secured to the lug 27. This shield is preferably formed of sheet metal and is of angular cross-section. The forward edge of the shield engages in the groove 26, and the forward portion thereof seats upon the forward face of lug 27. The forward portion of the shield is thus inclined upwardly and rearwardly and extends over the top of the sill 5, and the rearward portion of the shield extends rearwardly over the conveyor 7 for a suitable distance.

Hold down clips 29 are secured to the shield 28 as by means of rivets 30. These clips are secured to the respective lugs 27 in a suitable manner, as by a screw 31 passing through a suitable opening in the clip 29 and shield 28, and threading into an opening 32 in the lug 27 for clamping the shield to the sickle guard. The forward portion of the clip 29 is of arcuate shape to provide a recess 33 for permitting the rivets 20 to move freely thereunder. The clips also act to prevent any upward movement of the cutter bar 20.

The shield 28 provides a smooth and continuous surface between the sickle guards and the conveyor for directing the cut vines upwardly over the sill 5 and onto the conveyor 7. Furthermore, the upper surface of the sickle, comprising the knives 19 and bar 20, is flush with the upper edge of shoulder 25, as clearly shown in Figure 3. This is advantageous as avoiding obstruction to flow of the cut material to and over the shield 28, from the sickle, such as would occur if shoulder 25 projected above the upper surface of the sickle. Also, by reason of the fact that the shoulders 26 of the sickle units are in endwise contact, a continuous groove and shoulder are provided for the full length of the sickle guard assembly. Since the forward edge of the shield engages into this groove and is disposed in rear of the shoulder and below the upper edge thereof, and the guard is tightly clamped to the lugs 27, it is impossible for the cut vines to get caught beneath the forward edge of the shield and cause clogging of the sickle.

It will be apparent to those skilled in the art, that changes in construction and arrangement of parts of my invention may be resorted to without departing from the field and scope of the same, and I intend to include all such variations, as fall within the appended claims, in this application in which the preferred form only of my invention is disclosed.

What I claim is:—

1. In combination in harvesting means, a frame, a conveyor supported by said frame, a sickle guard secured to said frame, a shoulder having a groove therein formed on said sickle guard, and means engaging in said groove and providing a continuous delivery surface from said guard to said conveyor.

2. In combination in harvesting means, a frame, a conveyor supported by said frame, a sickle guard secured to said frame, lugs formed on said guard and inclined upwardly and rearwardly therefrom, and means secured to said lugs and providing a continuous delivery surface from said guard to said conveyor.

3. In combination in harvesting means, a frame, a conveyor supported by said frame, a sickle guard secured to said frame, a sickle bar associated with said sickle guard, lugs formed on said guard, said lugs being disposed wholly behind said sickle bar and being inclined upwardly and rearwardly from said guard, means comprising a shield providing a continuous delivery surface from said guard to said conveyor, and means carried by said shield for clamping the shield to said lugs.

4. In combination in harvesting means, a frame including a front sill, a conveyor operating in the frame, cutting means including a reciprocating sickle bar and a guard therefor disposed forwardly of the sill and below the upper edge thereof, said guard being provided with a rearwardly disposed rabbet, and a shield having its lower edge seating in the rabbet, said shield extending upwardly and rearwardly over the sill and projecting over the forward portion of the conveyor, the shield providing a continuous surface for delivering cut material from the sickle bar to the conveyor.

5. In combination in harvesting means, a frame including a front sill, a conveyor operating in the frame, cutting means including a reciprocating sickle bar and a guard therefor disposed forwardly of the sill and below the upper edge thereof, a shield extending from adjacent the rearward edge of the sickle bar and upwardly and rearwardly over the sill, said shield projecting over the forward portion of the conveyor, means on said guard disposed in front of and abutting the leading edge of said shield and forming a seal with the entire forward edge thereof for preventing entry therebeneath of materials cut by the sickle bar, and means securing said shield to said guard and positively preventing upward movement thereof.

6. In combination in harvesting means, a frame including a front sill, a conveyor operating in the frame, cutting means including a reciprocating sickle bar and a guard therefor disposed forwardly of the sill and below the upper edge thereof, a shield extending from adjacent the rearward edge of the sickle bar and upwardly and rearwardly over the sill, said shield being carried by said guard and having contact with said sill but being otherwise free therefrom projecting over the forward portion of the conveyor, means disposed in front of and abutting the leading edge of said shield and forming a seal with the forward edge thereof for preventing entry therebeneath of materials cut by the sickle bar, and means seating upon said shield for securing the shield in position and for guarding against upward movement of the sickle bar.

7. In combination in harvesting means, a frame including a front sill, a conveyor operating in the frame, cutting means including a reciprocating sickle bar and a guard therefor disposed forwardly of the sill and below the upper edge thereof, a shield extending from adjacent the rearward edge of the sickle bar and upwardly and rearwardly over the sill, said shield projecting over the forward portion of the conveyor, means forming a seal with the forward edge of the shield for preventing entry therebeneath of materials cut by the sickle bar, said means comprising a shoulder formed on said guard adjacent the rear edge of the sickle bar and extending above the leading edge of said shield, and means seating upon said shield and extending forwardly above said sickle bar for securing the shield to the guard and for confining the sickle bar against upward movement.

8. In combination in harvesting means, a frame including a front sill, a conveyor supported by said frame, a sickle structure, a sickle guard secured to said sill below the upper edge thereof and provided with an upwardly extending shoulder abutting the rear edge of the sickle structure, the upper edge of the shoulder being substantially flush with the upper face of the sickle, and a shield having its leading edge in contact with the rearward face of the shoulder, said shield extending upwardly and rearwardly from said shoulder over said sill to said conveyor and providing a continuous delivery surface from the guard to the conveyor.

9. In combination in harvesting means, a frame including a front sill, a conveyor supported by said frame, a sickle structure, a sickle guard secured to said sill below the upper edge thereof and provided with an upwardly extending shoulder abutting the rear edge of the sickle structure, the upper edge of the shoulder being within the vertical thickness of the sickle, and a shield having its leading edge in contact with the rearward face of the shoulder, said shield extending upwardly and rearwardly from said shoulder over said sill to said conveyor and providing a continuous delivery surface from the guard to the conveyor.

10. In combination in harvesting means, a frame including a front sill, a conveyor supported by said frame, a sickle structure, a sickle guard secured to said sill below the upper edge thereof and provided with an upwardly extending shoulder abutting the rear edge of the sickle structure, the upper edge of the shoulder being within the vertical thickness of the sickle, and a shield disposed with its leading edge below the upper edge of the shoulder and closely adjacent the rearward face of said shoulder, said shield extending upwardly and rearwardly from said shoulder over said sill to said conveyor and providing a continuous delivery surface from the guard to the conveyor.

In witness whereof, I hereunto subscribe my name this 24th day of April, 1931.

CHARLES J. SCRANTON, Jr.